J. BRYAN & H. ETHERIDGE.
TROLLEY WIRE HANGER.
APPLICATION FILED MAR. 20, 1907.
899,858.
Patented Sept. 29, 1908.
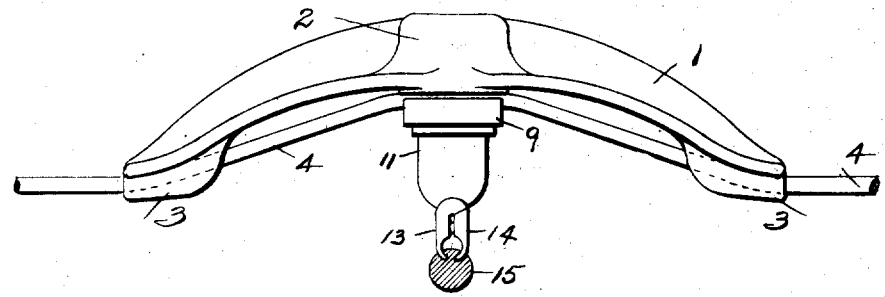
FIG. I.
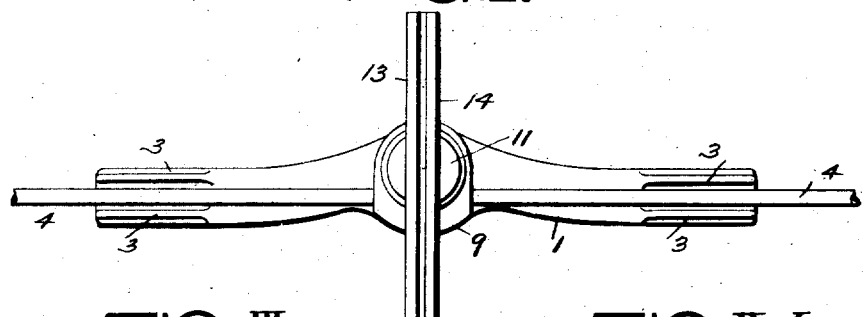
FIG. II.
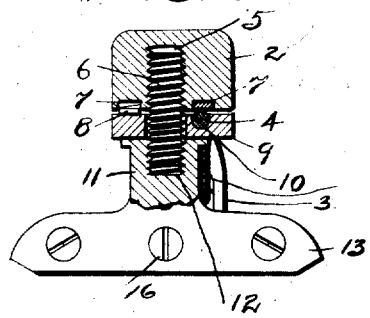
FIG. III.
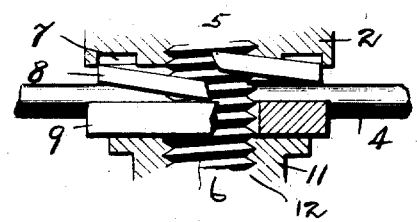
FIG. IV.
Witnesses.
S. M. Rutledge
J. W. Earl
Inventors
James Bryan & Harry Etheridge
By R. S. Harrison
Attorney.

UNITED STATES PATENT OFFICE.

JAMES BRYAN, OF PITTSBURG, AND HARRY ETHERIDGE, OF McKEESPORT, PENNSYLVANIA.

TROLLEY-WIRE HANGER.

No. 899,858.　　　Specification of Letters Patent.　　　Patented Sept. 29, 1908.

Application filed March 20, 1907. Serial No. 363,389.

*To all whom it may concern:*

Be it known that we, JAMES BRYAN, a subject of Edward VII, King of Great Britain, and HARRY ETHERIDGE, a citizen of the United States, residing at Pittsburg and McKeesport, respectively, in the county of Allegheny and State of Pennsylvania, have invented a new and useful Improvement in Trolley-Wire Hangers, of which improvement the following is a specification.

In overhead trolley systems it has been found that the present trolley wire hangers present several disadvantages in that they are difficult of quick adjustment along the span wire in respect to the center of the track; difficult to keep the connecting parts from working loose, thus causing detachment of the trolley wire from the hanger proper; difficulty of securing a flexible movement of the ear with respect to the operating alinement of the trolley wire, etc.

The object of our invention is to provide a hanger capable of eliminating the objections enumerated, the form selected to carry out our invention being hereinafter fully shown and described in the accompanying drawings and specifications and later pointed out in the appended claims, in which drawing Figure I is a longitudinal elevation of the hanger as associated with the trolley and span wires. Fig. II is an inverted plan of same disassociated from the trolley wire. Fig. III is a transverse section of the same, and Fig. IV is an enlarged and exaggerated section through same.

Similar reference characters denote like detail parts throughout the following description.

The invention consists of a metal spanning member 1, the extremities of which are on a plane, horizontally, below that of the boss 2 located midway therebetween, and provided with grooves formed by and between the longitudinally disposed lugs 3, engaging over the span wire 4, extending across the center of the track, said boss having a vertically disposed threaded orifice 5 therein to receive the stud 6 and a recess 7 concentric with said orifice to confine the split spring washer 8, said stud orifice being, in plan, preferably but not necessarily out of alinement with the grooves at the ends of the hanger so as to permit the span wire passing the stud without departing from a straight line. The stud has fitted thereover a crimping washer 9, provided at one side with a transverse groove 10 to engage the span wire, the lower end of said stud being connected to a shouldered member 11, by means of the threaded opening 12 therein, said member engaging the crimping washer at its upper end and performing the function of a nut while the lower end thereof is provided with a pair of horizontally disposed ears 13 and 14 to engage the trolley wire 15, said ear 14 being connected to the integral one 13 by screws, 16.

The application and effect of the device is as follows: The arch shaped hanger or spanning member 1 is placed over the span wire, and (by means of a plumb line) the center of the track located, previous to or after which the stud is screwed partially into the threaded orifice of the member after the spring washer has been placed into the recess, with the split portion at right angles to and on the opposite side of the span wire, followed by the crimping washer the span wire being placed and permitted to rest in the groove thereof, after which the ear member 11 is then applied to the lower end of the stud and screwed up until the span wire is clamped between the washer and hanger member, thus forcing that portion of the wire between the ends of the hanger member out of alinement into what may be termed an "arch" or "crimp", thus taking up the slack in the wire, after which the nonintegral ear piece 14 is slacked up, by unloosening the screws and the trolley wire clamped therebetween.

It will be observed that in securing the device in place upon the span wire the crimping washer is prevented from "canting" upon the stud, and injuring the thread thereof by the action of the point of the split spring washer bearing upon the side of the crimping washer opposite to that where it engages the span wire, and in addition thereto said spring places a tension upon the ear member establishing a rigidity between the same and hanger member and at the same time permit the ear member swinging into a horizontal plane to accommodate operative alinement of the trolley wire. The pressing of the span wire against the hanger assists the "crimp" in decreasing the tendency of the hanger sliding along the span wire. Again, the pressure of the spring acting in opposition, on the opposite side of the crimping washer, to that of the ear member will maintain sufficient pressure of the crimping washer against the span wire as to make it unnecessary that said ear member be screwed as tightly in place were the spring absent.

While we have shown and described specifically a certain form of structure, capable of fulfilling the objects we have in view, we also recognize and hold that variation in form, etc., are possible without departing from the scope of our invention.

Having thus shown and described an operative device, we claim as our invention:

1. The combination of a span-wire having an arch formed thereon, a member spanning the arch of and engaging said span-wire, a trolley-wire connecting member deflectably connected to said spanning member, a clamping member between said connecting members to clamp the arch portion of said wire, and means to place tension on the trolley-wire member.

2. The combination of a span-wire having an arch formed thereon, an arched member spanning the arch portion of and engaging said wire, a trolley-wire connecting member threadably connected to said spanning member, and a clamping member arranged on the threaded connection of said members and having a groove therein to engage the arch portion of said span wire.

3. The combination of a span-wire having an arch formed thereon, an arched member spanning the arch of and engaging said wire, a trolley-wire connecting member threadably connected to said spanning member, a clamping member arranged upon the threaded connection of said members and having a groove therein to engage the arch portion of said wire, and a tension member arranged between the clamp and spanning member.

4. The combination of a span-wire having an arch formed thereon, an arched member spanning the arched portion of and engaging said wire at the base of the arch, a trolley-wire connecting member threadably attached to and supported by said spanning member, a clamping member interposed between said members to clamp the arched portion of said wire, and a tension member arranged between the spanning member and clamp member, said tension member engaging the clamp member on the opposite side of the wire clamped thereby.

5. The combination of a span-wire having an arch formed thereon, an arched member provided with grooved extremities and spanning the arched portion of said wire and engaging the same at the grooved extremities, a trolley-wire connecting member, a threaded connection between said members, a clamp member interposed between said members and provided at one side with a groove for the wire clamped thereby, and a tension member engaging the clamp member on the opposite side of the wire clamped thereby.

6. The combination of a span-wire having an upwardly disposed arch formed thereon, a member arranged on and spanning the arch portion of said span-wire, a trolley-wire connecting member deflectably suspended from said spanning member, a clamping member interposed between said members to clamp the span-wire to the spanning member, and means to maintain the clamping member in active position and place tension on said trolley-wire connecting member.

7. The combination of a span-wire having an upwardly disposed arch formed thereon, a member arranged upon and spanning the arch portion of said wire, a trolley-wire connecting member deflectably suspended from said span-wire member, means at the point of suspension to clamp the span wire at the apex of its arch to the said span-wire member, and means to place tension on the said trolley-wire member.

In testimony whereof, we have hereunto signed our names in the presence of two subscribing witnesses.

JAMES BRYAN.
HARRY ETHERIDGE.

In the presence of—
W. W. HOWARD,
EDWIN WINTER.